A. M. WORCESTER.
ANIMAL TRAP FOR CATCHING RATS, MICE, AND THE LIKE.
APPLICATION FILED MAR. 5, 1921.
1,379,326.
Patented May 24, 1921.
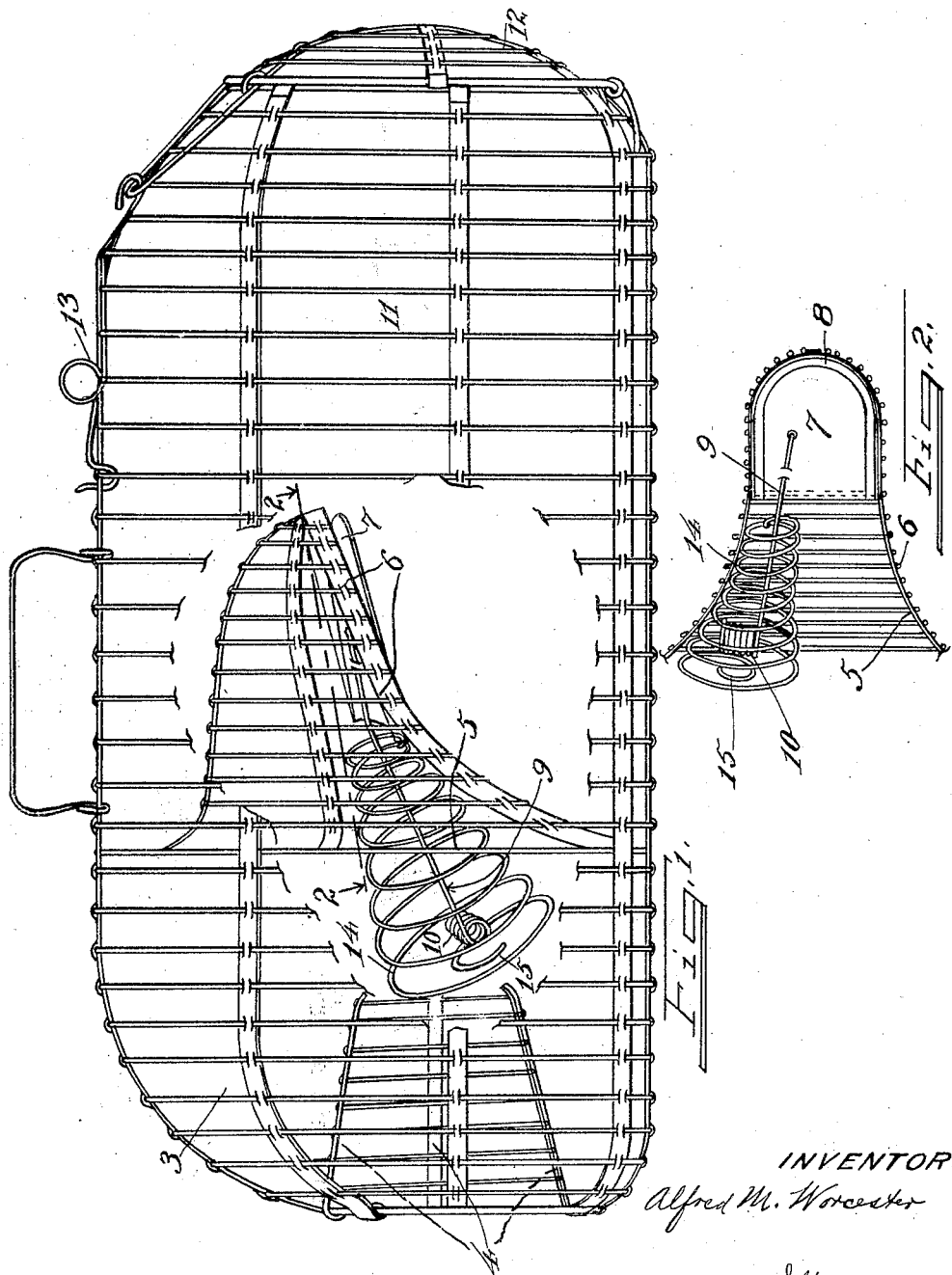
INVENTOR:
Alfred M. Worcester
BY John Elias Jones
ATTORNEY.

UNITED STATES PATENT OFFICE.

ALFRED M. WORCESTER, OF CINCINNATI, OHIO.

ANIMAL-TRAP FOR CATCHING RATS, MICE, AND THE LIKE.

1,379,326.                Specification of Letters Patent.      Patented May 24, 1921.

Application filed March 5, 1921. Serial No. 449,984.

*To all whom it may concern:*

Be it known that I, ALFRED M. WORCESTER, a citizen of the United States of America, and a resident of Cincinnati, in the county of Hamilton and State of Ohio, have invented a certain new and useful Improvement in Animal-Traps for Catching Rats, Mice, and the like, of which the following is a specification.

This invention relates to animal-traps and more especially to those used for catching rats, mice and similar rodents, and it refers more directly to the well-known rat and mouse trap structure that has two chambers, an entrance or open one and an imprisoning or closed one, with an intervening partition or dividing wall containing an automatically-closing tiltable trap-door leading from said open chamber to said closed chamber. The said open chamber is designed and intended to allow the animal to go in and out freely and thus become familiar with the trap in general. Into this open chamber there projects or extends a balance-arm that is attached to the said tiltable trap-door and by its weight causes the trap-door to automatically close as soon as the animal passes onward in its flight through the door, when opened by his weight thereon, into the final or closed chamber immediately beyond. The animal is now imprisoned and cannot retreat or escape unless the trap-door is opened.

The said balance-arm that projects into the entrance or open chamber is exposed in said old form of trap to the movements of such other animals as are not imprisoned, but are free to run and caper in and out and around the inside of the said open entrance-chamber. Involuntarily, these animals that are free, if they pass beneath the said balance-arm, are apt to come in contact with the weighted end of said balance-arm and cause it to rise and thereby open the trap-door, thus permitting the backward return and release of the animal or animals already caught in the final or closed imprisoning-chamber. This has been a detriment to the said well-known form of trap and users have been puzzled to know how the rats caught in the imprisoning-chamber have escaped and removed the bait therefrom without leaving any trace of their departure. The improvement herein is aimed to correct that very serious fault and it consists essentially of a wire-guard that is designed and intended to protect the said balance-arm from the said troublesome interference by the outside or freely disposed animals not already caught. This wire-guard is composed of a tapering spiral-wire inclosure that extends into the said open play-chamber and surrounds the said rearwardly-projecting balance-arm admitting of the free operation of said balance-arm, and, also, allowing the free access of the outside animals to their said play-ground in the primary or open entrance-chamber of the trap, but at the same time will positively prevent said outside animals from interfering, accidentally or otherwise, with the said tiltable trap-door and thus, too, from releasing the already imprisoned animals in the closed chamber through said trap-door.

The minor details of structure will be fully described in connection with the accompanying sheet of drawings, in which—

Figure 1 is a longitudinal elevation of an ordinary wire, animal-trap, of the well-known rat type, showing my invention in operating position therein through a broken-out portion of the side of the trap, with the tiltable trap-door slightly open and its balance-arm about midway of its vertical range of movement; and Fig. 2 is a sectional plan view of the trap-door and its wire mounting-frame, showing my improved wire-guard protector-device in place surrounding the balance-arm of the trap-door, taken on the dotted-line 2,—2 of Fig. 1.

3 indicates the ordinary open entrance-chamber forming the preliminary play-ground of the trap and provided with the usual tapered entrance-funnel 4 whose inner end lies to the rear of the transverse dividing wire net-work or partition 5.

The partition 5 has a tapered forwardly-projecting wire-work 6 in which is located a tiltable platform or trap-door 7 that is automatically held closed against a flange 8 by means of a weighted balance-arm 9 projecting rearwardly in the wire-work 6 of the partition 5. The spirally-wound end or coil 10 at the free end of the balance-arm 9 forms the weight necessary to hold the trap-door closed but not sufficient to prevent the weight of a rat on the platform or door 7 tilting it into open position for the rat to pass helplessly onward through the opening into the secondary or closed imprisoning-chamber 11 beyond said partition 5, where he becomes caught, subject, however, to removal through the customary release-door 12 that has a suitable latch-wire 13.

14 indicates a tapered guard made of an openly-wound coil or spiral of wire, the same as that of the strands of wire in the body of the trap itself, and having its rear end of greatest diameter, sufficient for the weighted rear end of the balance-arm 9 to clear and freely swing therein for the full open and closed positions of the trap-door at the fore end of said balance-arm.

The inner or fore end of the guard 14 is attached to the strands of the forwardly-projecting frame or wire-work 6 of the partition in any suitable manner. The rear end of said guard is closed with an inwardly-turned final coil 15 to prevent the free or outside animals in the open or play chamber 3 entering therein to interfere with the balance-arm 9 in any way.

I claim:—

In an animal or rat trap comprising a body-portion having an open or preliminary rear chamber or play-ground and a closed or final fore chamber or imprisoning-inclosure separated or divided by a partition or wire-work having mounted therein a tiltable trap-door for the ensnaring and onward passage of the outside animals from said play ground or chamber into the adjoining imprisoning chamber, a rearwardly-projecting balance-arm attached to the said trap-door and adapted to keep it automatically closed, and a guard or coil of wire or the like surrounding said balance-arm in the play-chamber and adapted to protect said balance-arm from the movements or interference of the animals in the play-chamber and the return of the caught or captured animals backwardly through the trap-door from the imprisoning-chamber.

ALFRED M. WORCESTER.